(12) United States Patent
Xu et al.

(10) Patent No.: US 10,425,343 B2
(45) Date of Patent: Sep. 24, 2019

(54) PACKET CLASSIFICATION

(71) Applicant: HANGZHOU H3C TECHNOLOGIES CO., LTD., Hangzhou, Zhejiang (CN)

(72) Inventors: Dawei Xu, Beijing (CN); Chushun Wei, Beijing (CN); Kai Ren, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/569,137

(22) PCT Filed: Apr. 29, 2016

(86) PCT No.: PCT/CN2016/080678
§ 371 (c)(1),
(2) Date: Oct. 25, 2017

(87) PCT Pub. No.: WO2016/173541
PCT Pub. Date: Nov. 3, 2016

(65) Prior Publication Data
US 2018/0152385 A1 May 31, 2018

(30) Foreign Application Priority Data
Apr. 30, 2015 (CN) .......................... 2015 1 0217646

(51) Int. Cl.
H04L 12/28 (2006.01)
H04L 12/851 (2013.01)
(Continued)

(52) U.S. Cl.
CPC ........ H04L 47/2441 (2013.01); H04L 45/745 (2013.01); H04L 47/32 (2013.01); H04L 69/22 (2013.01)

(58) Field of Classification Search
CPC .......................... H04L 47/2441; H04L 45/745
See application file for complete search history.

(56) References Cited

U.S. PATENT DOCUMENTS

2003/0053448 A1* 3/2003 Craig ................. H04L 67/2814
370/353
2010/0192215 A1 7/2010 Yaxuan et al.
(Continued)

FOREIGN PATENT DOCUMENTS

CN 102420831 A 4/2012
CN 102308533 B 10/2013
(Continued)

OTHER PUBLICATIONS

Yaxuan Qi et al: "Packet Classification Algorithms: From Theory to Practice". INFOCON 2009. The 28th Conference on Computer Communications. IEEE, IEEE, PI Scataway, NJ, USA, and Apr. 19, 20G9 (Apr. 19, 2009), pp. 648-656, XP031468811; ISBN: 978-1-4244-3512-8. (Year: 2009).*

(Continued)

Primary Examiner — Chi H Pham
Assistant Examiner — Fahmida S Chowdhury

(57) ABSTRACT

In an example, a method for packet classification may include cyclically splitting an initial rule set to generate multiple rule subsets, performing tree building for each rule subset to obtain multiple decision trees. The cyclic splitting may select a target rule set having a highest global average overlap rate, from a rule set group which includes the initial rule set before the cyclic splitting and will include the multiple rule subsets after the cyclic splitting; split the target rule set according to a split point to obtain two rule sets; add the two rule sets into the rule set group to replace the target rule set; and continue to select a new target rule set from the (Continued)

rule set group, until the number of rule sets in the rule set group reaches a preset number.

15 Claims, 9 Drawing Sheets

(51) Int. Cl.
*H04L 12/741* (2013.01)
*H04L 12/823* (2013.01)
*H04L 29/06* (2006.01)

(56) References Cited

U.S. PATENT DOCUMENTS

| | | | | |
|---|---|---|---|---|
| 2013/0163426 | A1* | 6/2013 | Beliveau | H04L 67/327 |
| | | | | 370/235 |
| 2013/0215754 | A1* | 8/2013 | Tripathi | H04L 49/253 |
| | | | | 370/236 |
| 2015/0281098 | A1* | 10/2015 | Pettit | H04L 45/64 |
| | | | | 370/235 |

FOREIGN PATENT DOCUMENTS

| | | |
|---|---|---|
| CN | 103841112 A | 6/2014 |
| CN | 103888350 A | 6/2014 |
| CN | 102255788 B | 8/2014 |
| CN | 102405622 B | 11/2014 |
| WO | WO-2007048318 A1 | 5/2007 |

OTHER PUBLICATIONS

Extended European Search Report, EP Application No. 16785969.3, dated Jan. 24, 2018, pp. 1-12, EPO.

International Search Report and Written Opinion, International Application No. PCT/CN2016/080678, dated Jul. 22, 2016, pp. 1-6, SIPO.

Pankaj Gupta and Nick McKeown, "Packet Classification using Hierarchical Intelligent Cuttings," Stanford University, 1999, pp. 1-9.

Sumeet Singh et al., "Packet Classification Using Multidimensional Cutting," SIGCOMM'03, Aug. 2003, pp. 1-12, ACM.

Weitao Han et al., "Packet Classification Algorithm Based on Space-Decomposition," Application Research of Computers, Jul. 31, 2013, pp. 1-6 (incl. English Abstract), vol. 30, No. 7.

Yaxuan Qi et al., "Multi-dimensional Packet Classification on FPGA:100 Gbps and Beyond", Proc. of the 2010 international Conference on Field-Programmable Technology (FPT), 2010, pp. 1-8.

Yaxuan Qi et al., "Packet Classification Algorithms: From Theory to Practice," In Proc. IEEE Infocom'09, 2009, pp. 1-9, IEEE.

Ma et al., Abstract on "Multiple decision—tree packet classification algorithm based on rule set partitioning", Journal of Computer Applications, Sep. 1, 2013, pp. 2450-2454.

Han et al., Abstract on "Multiple Decision Tree Algorithm for Packet Classification Based on Dynamic Point Split", Journal of Electronics & Information Technology, vol. 35, No. 12, Dec. 15, 2013, 7 pp. 2985-2991.

* cited by examiner

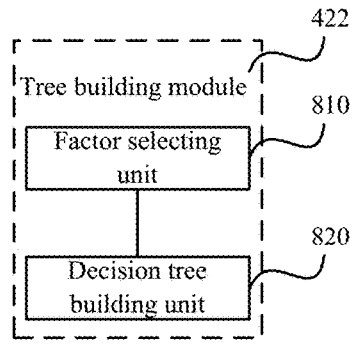
Fig. 8
RuleBK
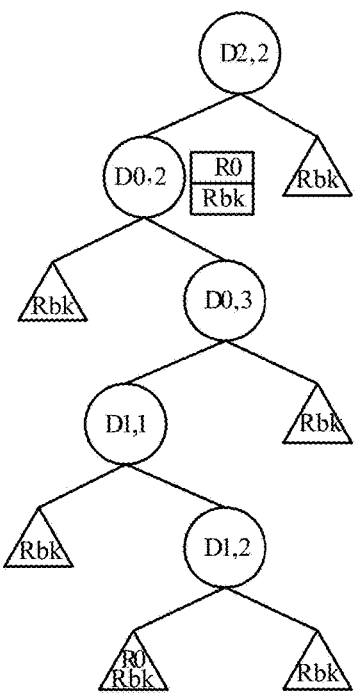
Fig. 9A
Fig. 9B
Fig. 9C

Rule0
| | | | | |
|---|---|---|---|---|
| DIM 0 | 0 | 1 | 2 | 3 |
| DIM 1 | 0 | 1 | 2 | 3 |
| DIM 2 | 0 | 1 | 2 | 3 |
Fig. 10A
RuleBK
| | |
|---|---|
| DIM 0 | unsense |
| DIM 1 | unsense |
| DIM 2 | * |
Fig. 10B
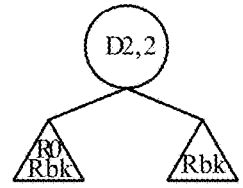
Fig. 10C
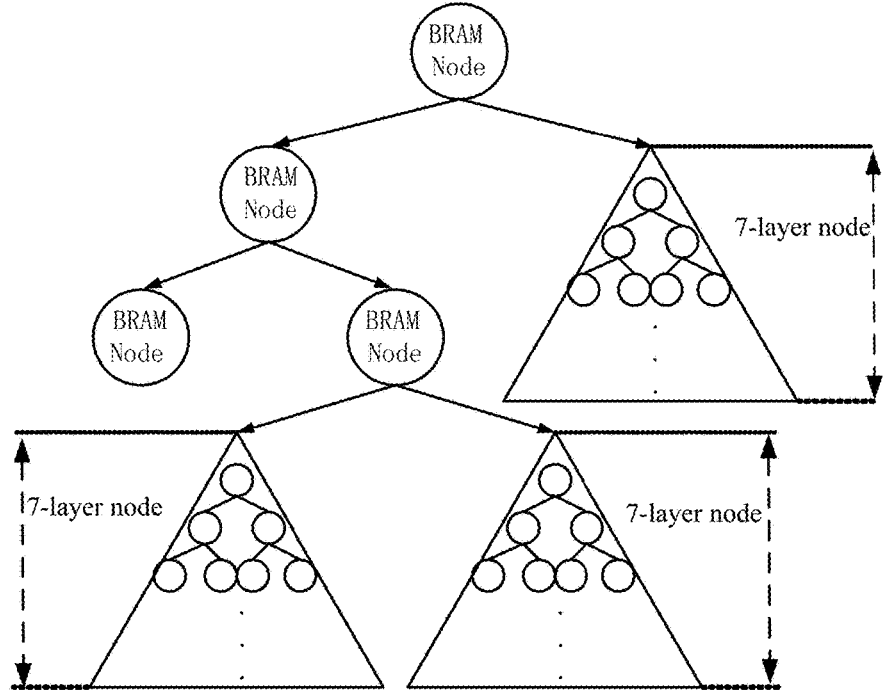
Fig. 11

PACKET CLASSIFICATION

BACKGROUND

Packet classification may include acquiring a rule which matches a specific field in the header of a packet according to a preset classification process, and performing an action specified by the acquired rule. Such packet classification may be used for various kinds of applications provided by network devices, such as access control, flow control, load balancing, and intrusion detection. Packet classification may base on a decision tree data structure. When a network device receives a packet, it may look up a rule set which matches the packet according to a classification process defined by the decision tree, and process the packet according to an action specified by a rule, such as dropping and forwarding the packet.

BRIEF DESCRIPTION OF THE DRAWINGS

FIG. 8 schematically illustrates functional modules in a device for packet classification according to an example of the disclosure;

FIG. 9A-FIG. 9C schematically illustrate the principle of a whole hole-filling mode according to an example of the disclosure;

FIG. 10A-FIG. 10C schematically illustrate the principle of a partial hole-filling mode according to an example of the disclosure;

FIG. 11 is a schematic structural diagram of a decision tree according to an example of the disclosure;

DETAILED DESCRIPTION OF THE EMBODIMENTS

Packet classification may be used for various kinds of applications provided by network devices. For example, when a network device receives a packet, it may look up a rule matching the packet according to a decision tree, so as to process the packet with an action specified by the rule, such as dropping the packet.

Hereafter, the method for packet classification according to the examples of the disclosure will be described in detail with reference to the drawings.

Figure 1:
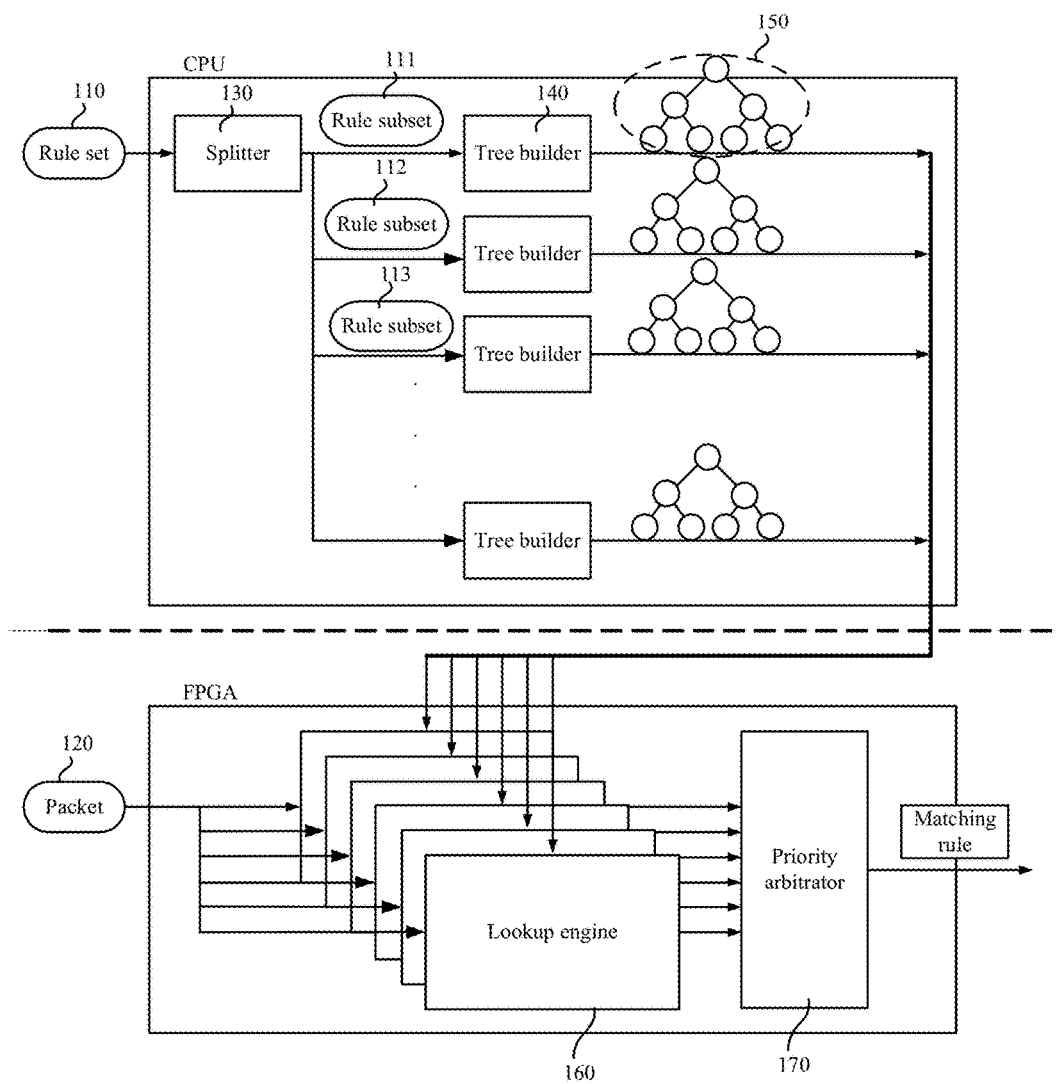
FIG. 1 schematically illustrates the principle of packet classification according to an example of the disclosure.

FIG. 1 schematically illustrates the principle of packet classification. As illustrated in FIG. 1, packet classification may be, for example, to determine a rule matching a to-be-classified packet 120 from a rule set 110 containing many rules. Table 1 shows an example structure of a rule for packet classification.

TABLE 1

| Rule for Packet Classification | | | | | |
|---|---|---|---|---|---|
| Rule ID | Source IP | Destination IP | Source Port | Destination Port | Action |
| 001 | 0.0.0.0/0 | 10.0.8.28/32 | 80 | 0~65535 | Drop |

The above table 1 illustrates part of fields included in a rule, and the rule may also include other information (such as priority of a rule). If field in the to-be-classified packet 120 matches the corresponding field in the above table 1, it means that the packet 120 matches the rule in the table 1. For example, if the source IP, the destination IP, the source port and the destination port included in the packet 120 matches the corresponding field in the rule with a Rule ID 001 (also termed as Rule 001), then the Rule 001 is determined as a rule matching the packet 120, and the packet 120 may be processed according to an action "Drop" specified in the Rule 001, that is, the packet 120 will be dropped.

FIG. 1 schematically illustrates how to determine a rule matching the packet 120 from a rule set 110. The whole process may be divided into a cyclic splitting process, a tree building process and a lookup process.

A splitter 130 may perform the splitting process for a rule set.

When building a decision tree for a rule set by a tree-building algorithm, rule splitting and duplication may occur. This may result in that the scale of the decision tree will become overlarge as more rules in the rule set overlap. In this case, it may be considered to split the rule set into smaller rule subsets and build a decision tree for each of the rule subsets. Thus, the overlapping of rules may be prevented to a large degree, and the scale of the decision tree may be efficiently reduced. Based on the above, in the example, by using a cyclic splitting method, an initial rule set may be into a preset number of rule subsets for each of which a decision tree may be built.

For example, the rule set 110 containing a plurality of rules may be split into rule subsets 111-113. Suppose that the rule set 110 includes 50 rules, after the splitting operation, the rule subset 111 may include 10 rules, and each of the rule subsets 112-113 may include 20 rules.

A tree builder 140 may perform the tree building process.

For each of the rule subsets 111-113 generated in the splitting process, a decision tree 150 may be correspondingly built by a tree building algorithm, as illustrated in FIG. 1. The decision tree 150 is a data structure describing the classification process.

Figure 2:
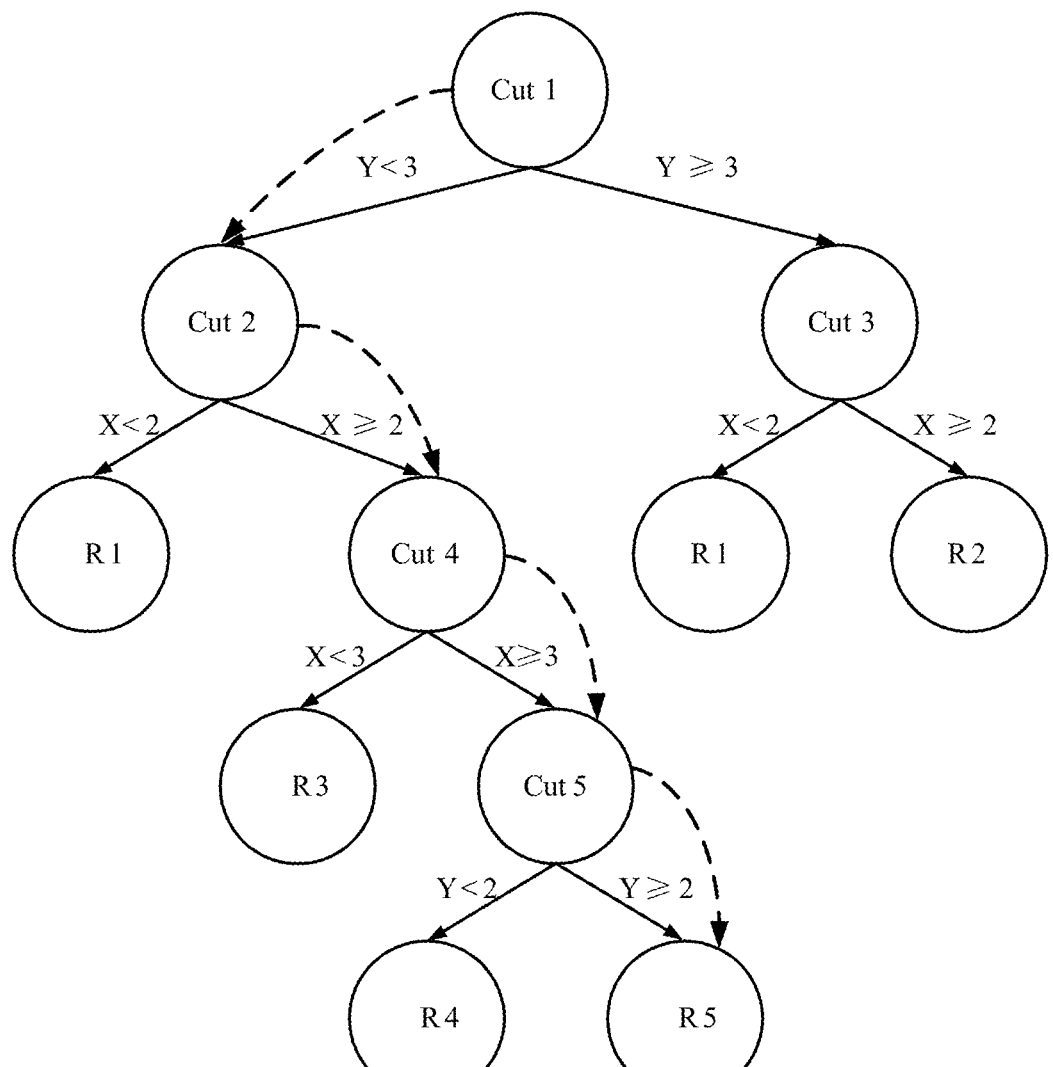
FIG. 2 schematically illustrates a decision tree according to an example of the disclosure.

FIG. 2 shows an example structure of a decision tree. Suppose that the decision tree illustrated in FIG. 2 is traversed to find a rule matching a two-dimensional (2D) point P (X, Y). The point P (X, Y) may represent, for example, a to-be-classified packet having a dimension X of "source IP" and a dimension Y of "destination port number". Take X=3, Y=2 as an example, wherein, X=3 means that the representative value for the source IP is 3, and Y=2 means that the representative value for the destination port number is 2. The lookup process in FIG. 2 may start from the root node of the decision tree to find a matching rule for the packet indicated by the point P (3, 2). The lookup process may include the following content.

Firstly, at the root node Cut1, the decision tree is branched with respect to the cut point p_cut (Y, 3) to obtain a left child node Cut2 (Y<3) and a right child node Cut3 (Y≥3). Since the value of P (3, 2) is less than 3 in the Y dimension, the lookup process turns to the left child node Cut2. At the node Cut2, the decision tree is further branched with respect to the cut point p_cut (X, 2) to obtain a left child node R1 (X<2) and a right child node Cut4 (X≥2). Since the value of P (3, 2) is more than 2 in the X dimension, the lookup process turns to the right child node Cut4. In this way, the lookup path indicated by the dashed arrow finally arrives at a leaf node R5, that is, rule R5 is determined as the rule matching the packet indicated by P (3, 2).

From the above it can be seen that the concept "cut" is used in the decision tree, and a packet may be classified according to the guidance of a cut point. The cut point may be represented as p_cut (cut dimension, cut point value), wherein, the cut point value is a value of the cut point in the cut dimension. The cut dimension may indicate dimensional information for the lookup path, and the cut point value may be used to direct the lookup process to different lookup paths according to the relationship of size between the value of a packet and the cut point value in the given cut dimension. For example, if the value of a packet is less than the cut point value in the given cut dimension, then the lookup path turns to the left child node, otherwise to the right child node.

As illustrated in FIG. 1, the above "splitting" and "tree building" process may be executed by a central processing unit (CPU). The CPU may execute corresponding machine executable instructions to perform the splitting and tree building processes for the rule set 110 to generate a plurality of decision trees. And the generated decision trees may be distributed by the CPU to field programmable gate array (FPGA). When receiving a to-be-classified packet 120, the FPGA may look up the rule matching the packet 120 according to the decision trees distributed from the CPU.

The FPGA may perform the lookup process for a matching rule.

The FPGA may distribute the decision trees respectively corresponding to each of the rule subsets which are generated in the tree building process, to the lookup engines 160. Each of the lookup engines 160 may look up a matching rule for a received packet 120 according to respective distributed decision tree. Then, the rules obtained by the lookup engines 160 may be delivered to a priority arbitrator 170 so as to be sorted according to the priorities of the rules. The priority arbitrator 170 may output the rule having the highest priority as the final matching rule for the packet 120. For example, the priority arbitrator 170 may output the ID of the rule (Rule ID), and a corresponding rule may be acquired according to the Rule ID.

Figure 3:
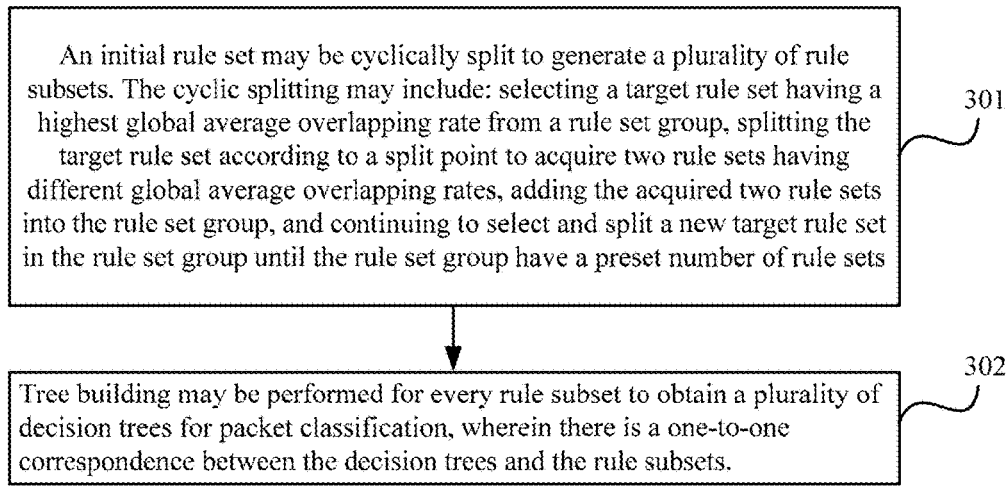
FIG. 3 is a flow diagram of a method for packet classification according to an example of the disclosure.

FIG. 3 is a flow diagram of a method for packet classification which may include blocks 301-302.

At block 301, an initial rule set may be cyclically split to generate a plurality of rule subsets. The cyclic splitting may include: selecting a target rule set from a rule set group, wherein the rule set group includes the initial rule set before the cyclic splitting and will include the plurality of rule subsets after the cyclic splitting, the target rule set is a rule set having a highest global average overlap rate (describe hereinafter) in the rule set group; splitting the target rule set according to a split point to acquire two rule sets having different global average overlap rates; adding the acquired two rule sets into the rule set group to replace the target rule set, and continuing to select a new target rule set from the rule set group, until the number of rule sets in the rule set group reaches a preset number.

At block 302, tree building may be performed for every rule subset to obtain a plurality of decision trees for packet classification, wherein there is a one-to-one correspondence between the decision trees and the rule subsets.

The above "splitting" process may be improved according to the flow diagram illustrated in FIG. 3. The splitting of a rule set may conform to such a principle that the rule set will be split into a relatively large and simple rule subset and a relatively small and complicated rule subset. This split principle may reduce the scale of the decision tree and shorten the generation time of the decision tree. However, this example may be also applicable to a case in which the two split-obtained rule subsets have the same number of rules.

Here, it should be noted that an initial rule set will be firstly read and added into an empty rule set group, and then the splitting process may start for the initial rule set. The rule subset herein refers to a rule set generated during the splitting of the initial rule set. And the names of "rule subset" and "rule set" are only for distinguishing whether a rule set is before or after splitting, and process components in an apparatus or a device will regard them as a rule set to execute split process.

Figure 4:
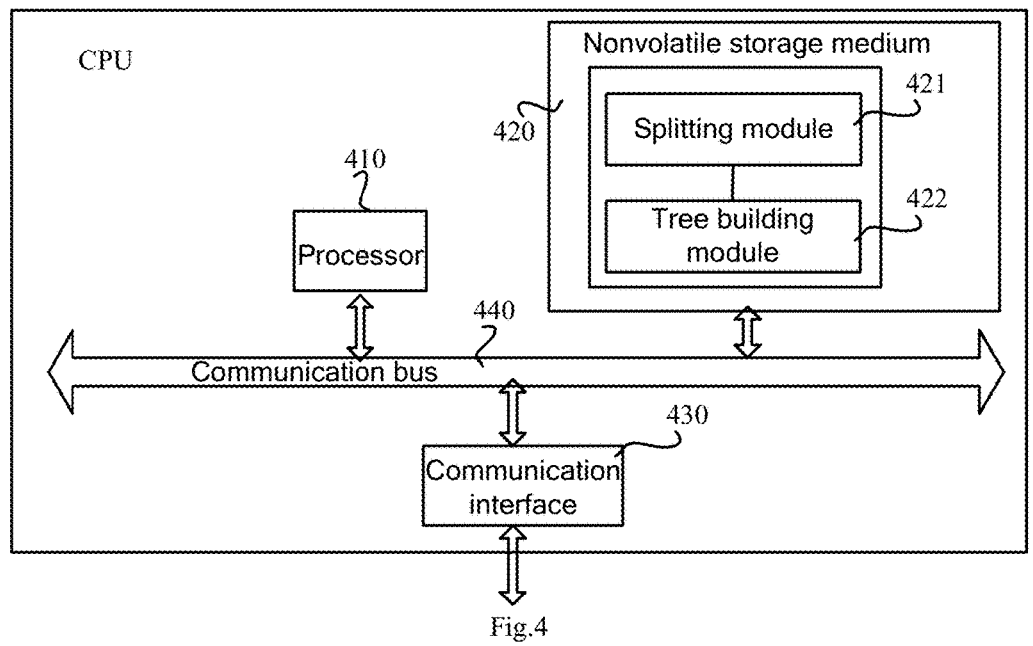
FIG. 4 is a schematic diagram of a device for packet classification according to an example of the disclosure.

The above described splitting process may be performed by the "splitter 130" in FIG. 1. The machine executable instructions corresponding to the splitter 130 may be stored into the nonvolatile storage medium 420 in a device for packet classification. The processor 410 in the device for packet classification may invoke and execute the machine executable instructions to perform the splitting process for a rule set. As illustrated in FIG. 4, the machine executable instructions corresponding to the splitter 130 may be stored into the nonvolatile storage medium 420 as a splitting module 421. The nonvolatile storage medium 420 may also store a tree building module 422. The splitting module 421 is used for executing the process of the block 301, and the tree building module 422 is used for executing the process of the block 302.

Figure 5:
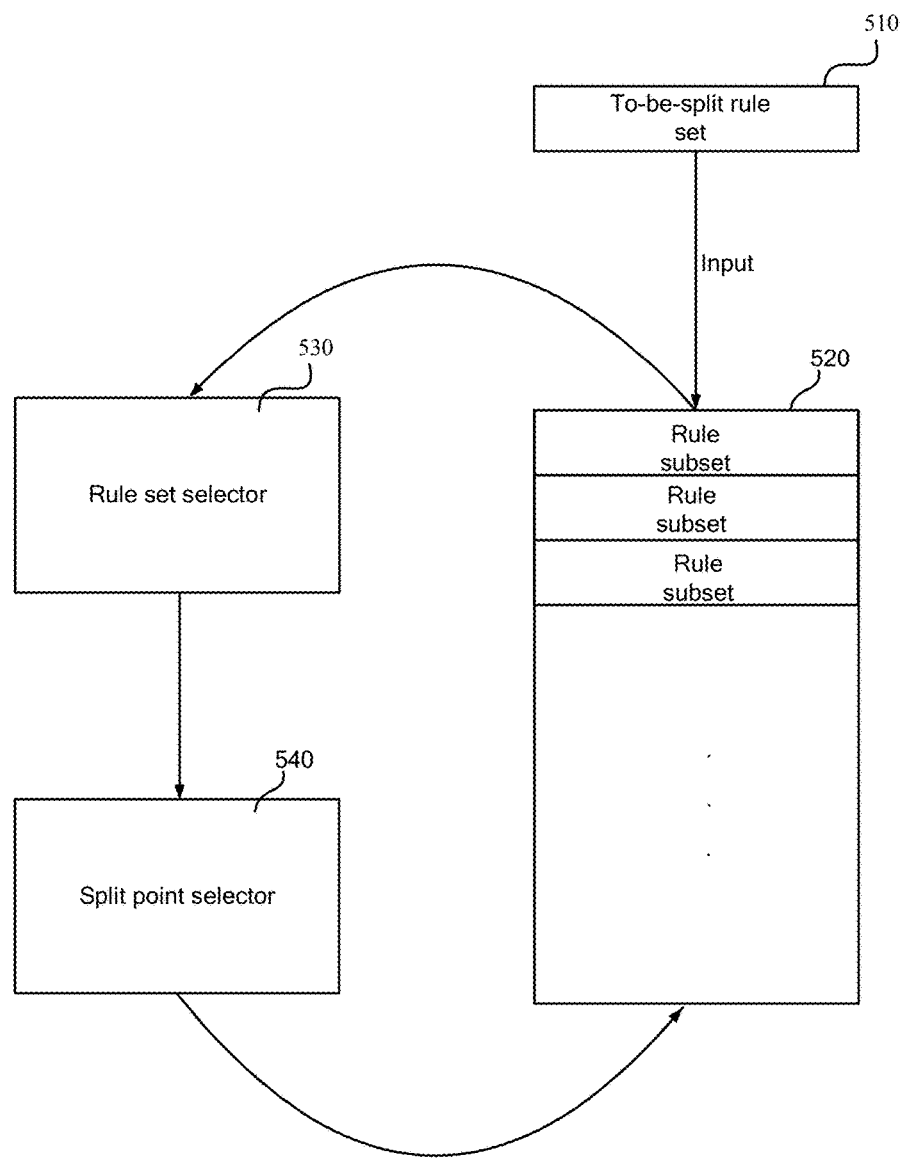
FIG. 5 schematically illustrates the principle for cyclically splitting a rule set according to an example of the disclosure.

At block 301, an initial rule set may be cyclically split into a preset number of rule subsets. FIG. 5 schematically illustrates the principle of the cyclic splitting method, which may involve the following basic parameters. For a given rule set (RS), the following parameters are fixed.

Overlap rate (olr): for a designated dimension (DIM), the cut point values in this dimension of all rules in a rule set may form a cut point value set. For example, as illustrated in FIG. 2, the cut point values in the X dimension include 2 and 3, and the cut point values in the Y dimension include 2 and 3, etc. Every two adjacent cut point values may define a cut section, that is, the cut section indicates the area between two adjacent cut point values. For example, the cut sections in the X dimension include X<2, 2≤X<3 and X≥3, and the cut sections in the Y dimension include Y<2, 2≤Y<3 and Y≥3. The number of cut sections covered by the values available for a specific rule in a designated dimension may be defined as the overlap rate of the rule in the designated dimension, and the value of the overlap rate is an integral number larger than 1. For example, as illustrated in FIG. 2, the range of values of the rule R1 in the X dimension is X<2, which covers one cut section X<2, thus the olr of the rule R1 in the X dimension is 1. The range of the values of the rule R2 in the X dimension is X≥2, which covers two cut sections 2≤X<3 and 3≤X, thus the olr of the rule R2 in the X dimension is 2. The range of the values of the rule R3 in the X dimension is X<3, which covers two cut sections X<2 and 2≤X<3, thus the olr of the rule R3 in the X dimension is 3. The ranges of the values of the rules R4 and R5 in the X dimension are both X≥3, which covers one cut section X≥3, thus the olrs of the rules R4 and R5 in the X dimension are both 1. Similarly, the overlap rates of the rule R1, R2, R3, R4, and R5 in the Y dimension are 3, 1, 2, 1, and 2, respectively.

Average overlap rate (avg_olr): for a designated dimension DIM, the olrs of all rules in the rule set in the dimension DIM are summed and then divided by the number of all the rules to obtain a value, and the obtained value is defined as the average overlap rate of the rule set in the dimension DIM. For example, as illustrated in FIG. 2, for a rule set [R1, R2, R3, R4, R5], its avg_olr in the X dimension is (1+2+2+1+1)/5=1.4, and its avg_olr in the Y dimension is (3+1+2+1+2)/5=1.8.

Overlap rate weight (p_olr): for a designated dimension DIM, the overlap rate of each rule in the rule set in the dimension DIM may be calculated. Suppose that the rule set includes n rules (n_rules), then the number of the overlap rates in the dimension DIM is also n_rules. If these overlap rates are sorted in an ascending order according to their values, for the rule $r_i$ at the location i∈(0, n_rules−1), its overlap rate weight p_olr may be defined as p_olr=((i+1)*100)/(n_rules)%.

Split point (p_split): the p_split may be used to split a rule set according to the overlap rate priorities in a designated dimension. For example, according to the p_olrs in the dimension DIM, the rule set may be split into two rule subsets sub_l and sub_r, wherein, the p_olr of each rule in the rule subset sub_l in the dimension DIM is less than or equal to a preset value, and the p_olr of each rule in the rule subset sub_r in the dimension DIM is larger than the preset value. Accordingly, by specifying a dimension DIM and the p_olr in the dimension DIM, a split point p_split may be determined for the rule set. And wherein, the specified dimension DIM may be termed as a split dimension dim_split, and the specified p_olr may be termed as a split point overlap rate weight p_olr_split, and the split point p_split may be represented as p_split (dim_split, p_olr_split). For example, according to the split point p_split (dim_split, p_olr_split), a rule set including N rules may be split into a rule subset sub_l including (N*p_olr_split) rules and a rule subset sub_r including (N*(1−p_olr_split)) rules. As seen in the above, the splitting may be performed based on a split point p_split (dim_split, p_olr_split), wherein, the split dimension dim_split indicates the dimensional information for splitting rules in a rule set, and the split point means a split position for splitting the rules in the rule set in the split dimension.

Global average overlap rate (rs_avg_olr): for a designated rule set, its avg_olr in each dimension may be determined, and the determined avg_olrs in all the dimensions of the rule set may be averaged so as to get the global average overlap rate rs_avg_olr of the rule set. For example, if the avg_olr of a rule set is 1 in a specific dimension DIM, then each rule in the rule set in the dimension DIM shall have an olr of 1, otherwise, the average overlap rate avg_olr of the rule set in the dimension DIM is not possible to be 1. The global average overlap rate (rs_avg_olr) may be used to measure the complexity of the whole rule set.

Figure 6:
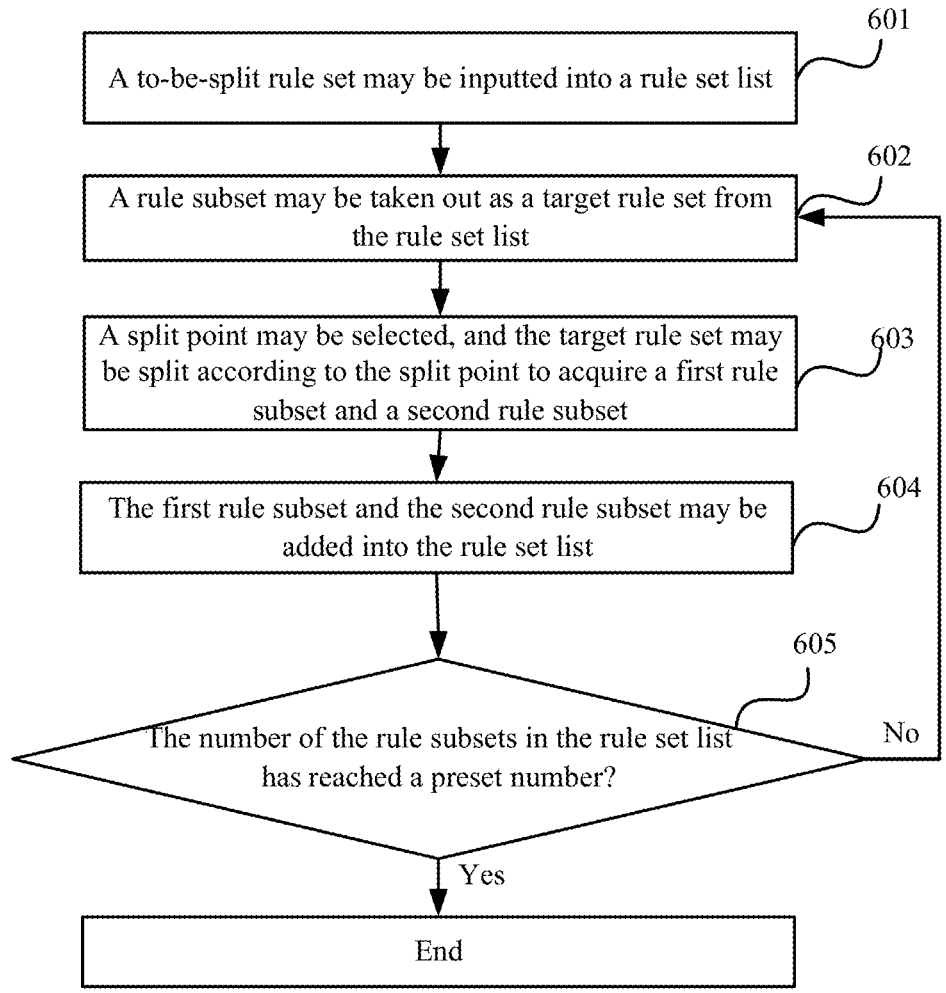
FIG. 6 is a flow diagram illustrating how to cyclically split a rule set according to an example of the disclosure.

When a rule set is split by using the cyclic splitting method in FIG. 5, the above parameters are involved. The following will give description in detail with reference to FIG. 5 and FIG. 6.

At block 601, a to-be-split rule set 510 may be inputted into the rule set list 520 which represents a rule set group.

For example, the to-be-split rule set 510 may be a rule set 110 in FIG. 1, and the rule set list (rs_list) 520 may be a bidirectional linked list. According to the arrow directions indicated in FIG. 5, one rule set is firstly taken out from the rule set list 520, and the rule set is split into two rule sets, and the split-obtained two rule sets are inserted into the rule set list 520; and then the above process is recycled (that is, a further rule set is taken out and split into two rule sets, then the two rule sets are inserted into the rule set list 520) until the number of rule sets in the rule set list 520 reaches a preset number.

In this example, a rule set in the rule set list 520 may be termed as a rule subset (Sub_RS), and a to-be-split rule set 510 may be input into the rule set list 520, and the above cyclic splitting operation may be performed for the input rule set 510.

At block 602, a rule subset may be taken out as a target rule set from the rule set list 520.

For example, if the rule set list 520 has only one initially inputted rule set 510, the only one rule set may be taken out as a target rule set. After performing the splitting process for the target rule set, the rule set list 520 may have at least two rule subsets, one of which may be taken out for the subsequent process similarly.

At this block, the selection of a rule subset may depend on the global average overlap rate rs_avg_olr, for example, a rule subset having the greatest rs_avg_olr may be selected as a target rule set. This is because that according to the method for packet classification in the example, a relatively complex rule set may be split into small rule subsets for tree building, and the rs_avg_olr may be used to measure the complexity of the rule set in whole. Further, in this example, the above "rule set list" may be also termed as a "to-be-split rule set group", and the rule subset to be taken out may be also termed as a "target rule set". The rule set selector 530 illustrated in FIG. 5 may move a target rule set out from the to-be-split rule set group according to the above principle, so as to perform the block 603.

At block 603, a split point may be selected, and the target rule set may be split according to the split point to obtain a first rule subset and a second rule subset.

For example, a split point may be selected by a split point selector 540 in FIG. 5, and a rule set may be split according to the split point. In this example, the target rule set may be split into two rule subsets including a first rule subset and a second rule subset according to the split point. The rs_avg_olr of the first rule subset may be less than that of the second rule subset, and the first rule subset may contain more rules than the second rule subset. In other words, one of the two split-obtained rule subsets may be relatively large and simple, and another may be relatively small and complex. Such splitting technique may enable the scale of the decision tree built for a rule set to be reduced.

Figure 7:
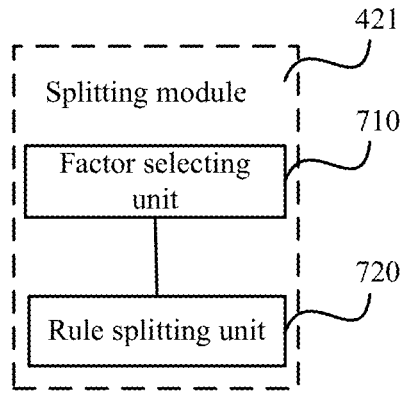
FIG. 7 schematically illustrates functional modules in a device for packet classification according to an example of the disclosure.

In an example, a method for selecting a split point may be provided. As mentioned in the above, the determination of a split point may involve two critical factors, i.e., the split dimension dim split and the split point overlap rate weight p_olr_split. As illustrated in FIG. 7, the splitting module 421 in this example may include a factor selecting unit 710 and a rule splitting unit 720. The factor selecting unit 710 may select a split dimension dim split of the split point according to the proportion of rules having an overlap rate olr of 1 in the target rule set and the average overlap rate of the target rule set. Then the factor selecting unit 710 may sort the rules in the target rule set in an ascending order for the overlap rates and determine the split point overlap rate weight p_olr_split according to the position of the last rule having an overlap rate of 1. Since the split dimension dim_split and the split point overlap rate weight p_olr_split are determined, the split point p_split may be also determined.

For example, the split dimension may be selected by weighting of two parameters, wherein, one parameter is the proportion of rules having an olr of 1 in the target rule set in a designated dimension, i.e., the proportion of relatively simple rules in the target rule set, and another parameter is the average overlap rate of the target rule set in the dimension. If the proportion of rules having an olr of 1 in the target rule set is represented as "x" and the average overlap rate is represented as "y", then the equation $w=a*x+b*y$ may be calculated in each of the dimensions. The weighting factors a, b may be set according to practical conditions. By comparing the calculated values of w in each of the dimensions, a dimension having the greatest w may be selected as a split dimension. In this example, since the dimension which has the greatest proportion of simple rules or has the greatest complexity is determined as the split dimension, the two parameters including the proportion of simply rules and the average overlap rate of the target rule set may be weighted so as to determine a proper split dimension.

A rule splitting unit 720 may split the target rule set into a first rule subset and a second rule subset according to the split point overlap rate weight in the split dimension determined by the factor selecting unit 710, such that the first rule subset includes a rule having an olr of 1, and the second rule subset includes a rule having an olr of more than 1. In this way, one of two rule subsets obtained by splitting the target rule set may have a special attribute, in which the avg_olr of the one rule subset is 1 in a specific dimension DIM (for example, the split dimension dim_split designated by the split point p_split).

At block 604, the first rule subset and the second rule subset may be added into the rule set list 520.

For example, in FIG. 5, two rule subsets obtained by splitting the target rule set according to the split point, may be inserted into the rule set list 520, so that the number of the rule subsets in the rule set list 520 is increased.

At block 605, it may be determined whether the number of the rule subsets in the rule set list 520 has reached a preset number.

For example, in this block, if the number of the rule subsets in the rule set list 520 has reached a preset number, then the splitting process for the rule set is terminated, and no further cyclic operation is performed. If it has not reached the preset number, the process returns to the block 602 for further cyclic splitting until the number of the rule subsets in the rule set list 520 reaches the preset number.

After the splitting process is completed, the tree building module 422 may perform tree-building for each of the rule subsets to obtain corresponding decision trees, and the obtained decision trees may be used for classifying a packet. For example, in a FPGA, for a to-be-classified packet, each of the decision trees may be looked up to obtain at least one matching rule, and a matching rule having the highest priority may be selected from the obtained matching rules as a target rule, and the packet may be processed according to the target rule.

In another example, the tree-building process may be further improved to design a fast tree-building algorithm. As described in the above with reference to FIG. 2, the cutting in the tree-building process may involve two critical factors of cut dimension and cut point value. The decision tree is actually a data structure for describing packet classification generated according to the cut dimension and the cut point value.

In this example, the selection of cut dimension may conform to a least overlap rate principle in which a dimension with rules mostly dispersed is preferred for cutting. A relatively small overlap rate may bring a relatively great number of cut point values, thus in this example, the dimension with the greatest number of cut point values may be selected as a cut dimension. For example, for a specific rule set, the number of cut point values in each of the dimensions is counted respectively, and the dimension with the greatest number of cut point values may be selected as a cut dimension. Meantime, a cut point value in the middle of all the cut point values in the cut dimension may be selected as a target cut point value, and cutting with respect to the target cut point value may generate left and right rule subsets each of which has an approximately same number of rules. For example, the cut point values in the cut dimension may be sorted in a sequence and a cut point value approximately in the middle of the sequence may be selected as a target cut point value. The sorting of cut point values may be performed, for example, by identifying all cut point values and sorting the identifications of the cut point values. Here, the selection of the target cut point value is merely illustrative, and the number of rules in the left and right rule subsets is not necessarily totally the same as long as approximately the same.

In tree-building for a rule subset, the rule subset may be cut based on cut dimension and target cut point according to the above principle. For example, suppose that a rule subset for which a decision tree is to be built includes 11 rules, then the rule subset may be cut according to the determination of the cut dimension and the target cut point value so as to obtain two cut subsets including a first subset and a second subset, wherein, the first and second subsets may include, for example, 5 and 6 rules, respectively. Then, the first and second subsets are to be cut, and the cutting for each of them is still based on the determination of the cut dimension and the target cut point value according to the same principle as described in the above. For example, when the first subset is to be cut, in the similar principle as above, the dimension with the greatest number of cut point values may be selected as a cut dimension, and the cut point value in the middle of all the cut point values in the cut dimension may be selected as a target cut point value. The similar process may continue and repeat until each of the finally obtained subsets includes one cut section in any dimension, and each of the finally obtained subsets may include at least one rule.

The above-described principle of fast tree building may be applied in the tree builder 140 in FIG. 1, wherein the tree builder 140 corresponds to logic instructions for tree building of rule subsets, and these logic instructions may be also termed as a tree building model 422. FIG. 8 illustrates the logic structure of the tree building module 422 including a factor selecting unit 810 and a decision tree building unit 820.

The factor selecting unit 810 may select a cut dimension and a target cut point value using a fast tree building algorithm. The fast tree building algorithm may select a dimension with the greatest number of cut point values as the cut dimension, and select a cut point value in the middle of all the cut point values in the cut dimension as a target cut point value.

The decision tree building unit 820 may cut the rule subset to obtain two subsets according to the cut dimension and the target cut point value selected by the factor selecting unit 810. Then the above process may be repeated until each of subsets obtained by the cutting operation includes a cut section in any dimension.

After splitting the rule set by the splitting process in the block 301, the above fast tree building algorithm may be used to accelerate the speed of tree building. However, this is not limitative, and other tree building algorithms may also be used to reduce the scale of the decision tree.

Further, when the tree building module 422 performs tree-building for a rule set, a different tree-building algorithm may be used for a different rule set. For example, the factor selecting unit 810 in the tree building module 422 may determine whether the rs_avg_olr of the rule subset for which a decision tree is to be built is less than or equal to a specific threshold for distinguishing a relatively large and simple rule set from a relatively small and complex rule set. If the rs_avg_olr of the rule subset is less than or equal to the threshold, it indicates that the rule subset is a relatively large and simple rule set, and the above fast tree building algorithm may be used to determine the cut dimension and the target cut point value so as to perform tree building for the rule subset. If the rs_avg_olr of the rule subset is larger than the threshold, it indicates that the rule subset is a relatively small and complex rule set, which may require a complex tree-building algorithm (such as hypersplit or qualityfirst algorithm) for tree building. In this way, the tree building quality for complex rule sets and the tree building speed for simple rule sets can be both guaranteed.

In another example, in order to further reduce the scale of the decision tree, after a preset number of rule subsets are generated and before tree building is performed for each of the rule subsets, a hole-filling process may be performed for each of the rule subsets. The hole-filling process may add a black hole rule into a rule subset. The black hole rule may include N (N is a natural number) dimensions which include n (1 ≤ n<N) non-sensitive dimensions. The hole-filling process may be executed by reading corresponding logic instructions by CPU.

The above hole-filling process for the rule subset may adopt a partial hole-filling mode. The principle of the partial hole-filling mode will be described below. Part dimensions of the black hole rule may be non-sensitive dimensions, and remaining dimensions may be sensitive dimensions. The black hole rule may appear non-sensitive characteristics in non-sensitive dimensions and all * characteristics in sensitive dimensions. Here, the symbol "*" represents the black hole rule may cover all possible values. In the partial hole-filling mode, non-sensitive dimensions of the black hole rule may be ignored during the tree building, which means the black hole rule may generate no cut point values and further no cut sections in the non-sensitive dimensions. However, in order to guarantee the accuracy of the black hole rule in remaining sensitive dimensions (i.e., dimensions having all * characteristics), when rule splitting occurs in non-sensitive dimensions, the black hole rule may be duplicated into two branches. Since the partial hole-filling mode utilizes the non-sensitive dimensions to reduce the number of the generated cut point values, the scale of the decision tree may be reduced so as to accelerate the efficiency of tree building.

FIG. 9A-FIG. 9C illustrate a decision tree generated using an all * hole-filling mode, and FIG. 10A-FIG. 10C illustrate a decision tree generated using a partial hole-filling mode. As illustrated in FIG. 9A and FIG. 10A, the hatched part in the rule Rule0 represents the value of the rule in the corresponding dimension DIM, wherein, the value of the rule in the dimension DIM0 is 2, the value of the rule in the dimension DIM1 is 1, and the value of the rule in the DIM2 is 0, 1. In the example, for the same rule Rule0, tree building processes using the all * hole-filling mode and the partial hole-filling mode may be simulated respectively to generate the decision trees as illustrated in FIG. 9C and FIG. 10C.

It can be seen that, when all * hole-filling is performed using the black hole rule RuleBK illustrated in FIG. 9B, one cutting is performed in the dimension DIM2, and two cuttings are performed in each of the dimension DIM0 and the dimension DIM1. The non-leaf nodes in the decision tree indicate cut nodes. As illustrated in FIG. 9C, the root node D2, 2 represents that the cutting occurs with respect to the cut point value 2 in the cut dimension DIM2, and the left branch includes the cut point values 0, 1, and the right branch includes the cut point values 2, 3. When each of the sub-trees satisfies a condition for terminating the cutting (i.e., the number of the cut nodes on each of the sub-trees is less than or equal to 2), the generated decision tree have 5 internal nodes and 6 leaf nodes totally, as illustrated in FIG. 9C.

When partial hole-filling is performed using the black hole rule RuleBK illustrated in FIG. 10B, one cutting is performed with respect to the cut point value 2 in the dimension DIM2, and the left sub-tree and the right sub-tree have both satisfied the condition of terminating the cut. According to the partial hole-filling mode, the left sub-tree has no cut point value or cut section in the dimension DIM0 and the dimension DIM1, and the obtained decision tree has one internal node and two leaf nodes totally, as illustrated in FIG. 10C.

Apparently, for the same rule set, the partial hole-filling mode may significantly reduce the scale of the decision tree in comparison with the all * hole-filling mode. Some characteristics of the black hole rule may be used to identify whether the hole-filling uses the partial hole-filling mode or the whole hole-filling mode. For example, each dimension of the black hole rule may have a numerical range from a relatively small value to a relatively large value such as [0, 1). If a dimension is represented using a special numerical range such as [1, 0), which is apparently quite different, thus the dimension may be identified as a non-sensitive dimension. According to the proportion of the non-sensitive dimensions in all dimensions of the rule, it can be determined whether the hole-filling for the rule adopts the partial hole-filling mode. If not all the dimensions of the black hole rule are non-sensitive dimensions, it can be determined that the hole-filling for the rule uses the partial hole-filling mode. As another example, a bitmap may be used to determine whether the hole-filling for the black hole rule uses the partial hole-filling mode. Suppose that the black hole rule includes eight dimensions, and each of the dimensions may be represented as one bit, and "0" represents a non-sensitive dimension, and "1" represents a sensitive dimension, then it may be determined whether the hole-filling for the rule uses the partial hole-filling mode according to whether there is a sensitive dimension of value "1". The above two ways are merely illustrative, and other ways may be used.

Further, since the rule finally outputted from the decision tree has no effect on the non-sensitive dimension, a Key comparing operation is to be further performed to determine whether the rule matches the packet. In other words, the comparison between corresponding fields of the packet with the finally outputted rule is not performed in a non-sensitive dimension, and therefore the Key comparing operation is to be further performed to determine whether the corresponding fields of the packet match with the finally outputted rule in the non-sensitive dimension. For example, suppose the SIP, DIP, SPORT, DPORT, PROT, VPNID, and TOS dimensions (which are not limitative) are non-sensitive dimensions, whether the rule finally outputted by looking up the decision tree matches the to-be-classified packet in these non-sensitive dimensions is still to be determined by a special process such as the Key comparing operation. Thus a combination scheme of partial hole-filling and Key comparison may be achieved. The above Key comparison process may be performed by a lookup engine 160 in the FPGA. After a matching rule is found according to the decision tree distributed to the lookup engine 160, then it may be determined whether the rule matches with the corresponding fields of the to-be-classified packet in the non-sensitive dimensions of the rule. In this way, the accuracy of the lookup process can be guaranteed and the scale of the decision tree can be reduced.

In another example, in order to increase the scale of the decision tree and the number of rule sets which can be supported by the method for packet classification, part of node information of the decision tree may be stored into a space near to the FPGA outside the BRAM. The BRAM may be termed as a first storage medium, and the space near to the FPGA outside the BRAM may be termed as a second storage medium, and the second storage medium may be for example dynamic random access memory (DRAM).

Figure 12:
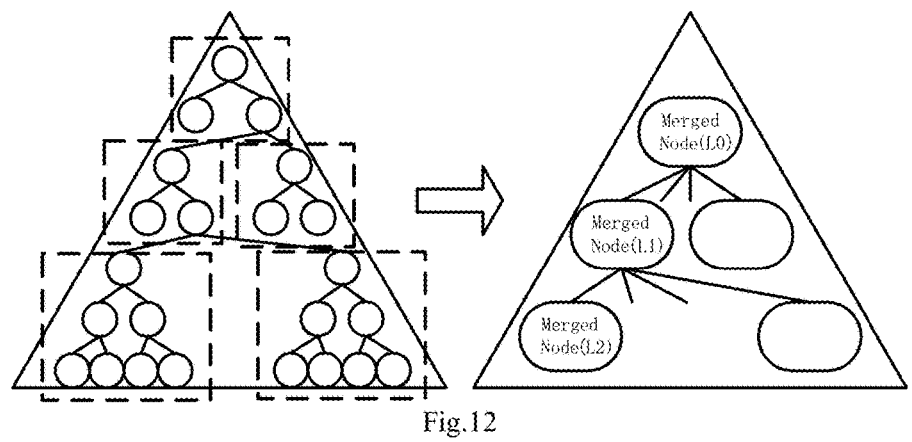
FIG. 12 is a schematic diagram for node merging according to an example of the disclosure.

FIG. 11 illustrates the structure of a decision tree. In this decision tree, the BRAM Node is a node stored in the BRAM, and the "7-layer node" is a sub-tree stored in the DRAM. Here, the 7-layer node in FIG. 11 is only an example, wherein any sub-tree with a depth of less than 7 may be stored in the DRAM. In another example, when the performance of hardware improves, the depth of the sub-tree may be more than 7 layers. Referring to FIG. 12, in this example, the nodes of several layers in the decision tree may be merged into one merged node by using node merging. For example, the nodes of 2 or 3 layers on the sub-tree may be merged into one merged node. Referring to FIG. 12, the merged node may comprise three nodes (merging 2 layers, totally 1+2=3 nodes) or seven nodes (merging 3 layers, totally 1+2+4=7 nodes). The number of nodes comprised in the merged node may be determined according to the greatest number of the nodes which can be read once when accessing the DRAM. Since the DRAM has a lower performance in whole and longer delay than the BRAM inside the FPGA, the accessing times of the DRAM may be adjusted according to the system access performance and the delay requirement, such that the lookup performance and the delay may be controlled within a suitable range. The above node merging may enable that the information about a plurality of nodes may be read once when accessing the DRAM, which improves the access performance and shortens the delay.

The node information about the merged node may be stored in a second storage medium DRAM. For example, the node information about each of the merged nodes may be stored into the DRAM and consume 256 bits (the number of bits is determined by the DRAM controller). And wherein, the 256 bits may store the node information about a 3-layer decision tree, that is, may store the node information about at most two layers of middle nodes (3 decision tree nodes) and one layer of leaf nodes (4 decision tree nodes). For example, as illustrated in FIG. 12, the merged node (L2) may store the node information about two layers of middle nodes and one layer of leaf nodes. The middle-layered nodes such as the merged node (L0) and merged node (L1) may only store node information about a two-layer decision tree. In the first storage medium on the FPGA, the node information may further include index information which is used to direct to the node information in the second storage medium when classification is performed according to the decision tree. For example, during the lookup process for a classification rule according to the decision tree, the lookup process may be first performed in the first storage medium, and then turn to the second storage medium according to the index information.

For example, the merged node stored in the above DRAM has a width of 256 bits, which may carry node information about at most 3 middle nodes and 4 leaf nodes, wherein, the node information may include rule indexes for the 4 leaf nodes and information related to the middle nodes. Further, whether the 4 leaf nodes are significant may also be represented by four bits in the above 256 bits.

As described in the above, by pushing the merged node into the DRAM for storage, the scale of the decision tree can be increased significantly so as to support a larger scale of rule set while the delay due to DRAM lookup is still within a controllable range.

Figure 13:
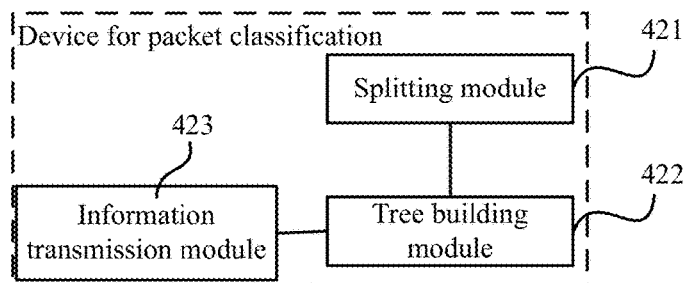
FIG. 13 schematically illustrates functional blocks in a device for packet classification according to an example of the disclosure.

As described in the above, the device for packet classification may further include an information transmission module 423. As illustrated in FIG. 13, the information transmission module 423 may send the node information about the decision tree to a nonvolatile storage medium. The storage medium may include a first storage medium on the FPGA and a second storage medium outside the FPGA. The node information about the merged node in the decision tree may be stored into the second storage medium. The merged node may include at least two nodes.

Further, in the example, the method for packet classification makes improvements on the splitting and tree building processes in packet classification. However, it does not necessarily mean all the improvements in all aspects are applied, and maybe only improvement in one aspect is applied. For example, it may be selected that the node information about the merged node is stored in the DRAM (here, the relations between the nodes in the DRAM and the nodes in the BRAM are pre-stored, so that the lookup process may hop from the BRAM to the DRAM when looking up a matching rule according to the decision tree), or, partial hole-filling is applied, or fast tree building algorithm is applied, etc.

Figure 14:
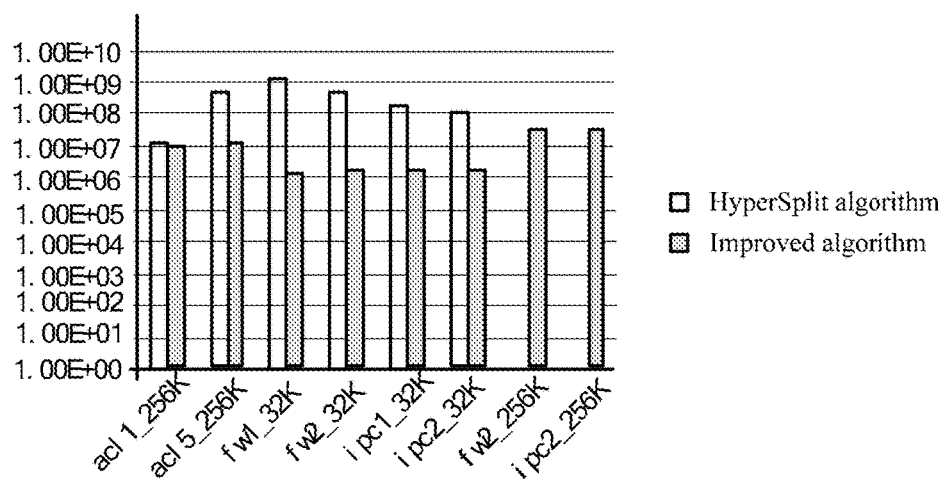
FIG. 14 is a statistic graph schematically illustrating the effect of a method for packet classification according to an example of the disclosure.
Figure 15:
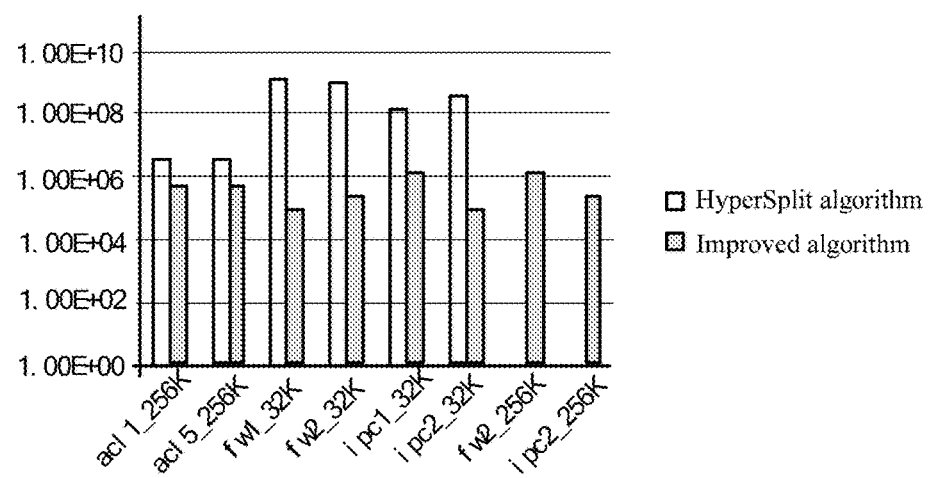
FIG. 15 is a statistic graph schematically illustrating the effect of a method for packet classification according to an example of the disclosure.

The following content may compare the HyperSplit algorithm with the solution in this example with respect to the time and resource consumed in processing the same rule set. Assume that the preset number of rule subsets finally obtained by splitting an initial rule set is 4, that is, the initial rule set is split into 4 rule subsets for each of which tree building is to be performed. FIG. 14 shows the comparison of time for generating a decision tree between the Hyper-Split algorithm and the improved algorithm (the technical solution in this example). FIG. 15 shows the comparison of the number of nodes in the generated decision tree between the HyperSplit algorithm with the improved algorithm. It can be seen that, the improved algorithm in this example is significantly advantageous over the HyperSplit algorithm in the time consumption and the number of nodes in the decision tree. For example, according to the improved algorithm in this example, the tree building time for the rule set fw1_32 k is decreased by approximately 3 orders of magnitude, and the number of nodes in the rule set is decreased by approximately 4 orders of magnitude. For the two rule sets of fw2_256 k and ipc2_256 k, the HyperSplit algorithm is automatically ended since it has been operating a rather long time so as to consume too much RAM resources, thus the relevant parameters cannot be known. By using the improved algorithm in this example, the tree building process may be successfully performed while the tree building time may be shortened, and the operating time and the scale of the decision tree may be within a controllable range.

Thus, in contrast to the Hypersplit algorithm, the method for packet classification in this example makes great improvement in the tree building time and the scale of decision tree. Further, for a rule set which cannot be processed by the HyperSplit algorithm, the process according to the method in this example will not be automatically ended by an operation system (OS) since the tree building time for the rule set is shortened, and the decision tree can be successfully generated while the scale of the decision tree can be shortened.

FIG. 4 illustrates a hardware structure of a device for packet classification according to an example of the disclosure. The device for packet classification may include a processor 410, a nonvolatile storage medium 420, a communication interface 430 and communication bus 440. The processor 410, the nonvolatile storage medium 420 and the communication interface 430 may communicate with each other through the communication bus 440. The above-mentioned method for packet classification may be performed by reading machine executable instructions stored in the nonvolatile storage medium 420 by the processor 410.

If the above functions are achieved in the form of software functional modules, a machine readable storage medium storing a program which includes the software functional modules can be used as an independent product or for sale. It can be understood that the technical solution of the present disclosure can be partly or totally achieved in the form of software product including a plurality of machine readable instructions, the software product may be stored in a storage medium, and a processing device (such as a personal computer (PC), a server, or a network device, etc.) reads out the software product to perform part or all of the blocks of the method in the examples of the present disclosure. And the above-mentioned storage medium may include: USB flash disk, removable hard disk, read-only memory (ROM), random access memory (RAM), magnetic disk or optic disk and other types of storage medium storing program code.

The foregoing examples are merely illustrative but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for packet classification, including:
  cyclically splitting an initial rule set to generate a plurality of rule subsets; and
  performing tree building for each of the rule subsets to obtain a plurality of decision trees for packet classification, wherein there is a one-to-one correspondence between the decision trees and the rule subsets,
  wherein, cyclically splitting the initial rule set includes:
    selecting a target rule set from a rule set group, wherein the rule set group includes the initial rule set before the cyclic splitting and will include the plurality of rule subsets after the cyclic splitting, the target rule set is a rule set having a highest global average overlap rate in the rule set group,
    splitting the target rule set according to a split point to obtain two rule sets having different global average overlap rates, and
    adding the two rule sets into the rule set group to replace the target rule set, and continuing to select a new target rule set from the rule set group, until the number of rule sets in the rule set group reaches a preset number and
  wherein, splitting the target rule set according to the split point to obtain two rule sets, includes:
    selecting a split dimension of the split point according to the proportion of rules having an overlap rate of 1 in the target rule set and an average overlap rate of the target rule set;
    sorting the rules in the target rule set in an ascending order for the overlap rates and determining a split point overlap rate weight of the split point according to the location of the last rule having an overlap rate of 1; and
    splitting the target rule set into a first rule subset and a second rule subset according to the determined split point overlap rate weight in the selected split dimension, wherein the first rule subset includes a rule having an overlap rate of 1, and the second rule subset includes a rule having an overlap rate larger than 1.

2. The method according to claim 1, wherein, performing the tree building for each of the rule subsets, includes:
  cutting the rule subset using a fast tree building algorithm, until each of subsets obtained by the cutting has one cut section in any dimension,
  wherein, the fast tree building algorithm includes:
    selecting a dimension having the greatest number of cut point values as a cut dimension;
    selecting a cut point value in the middle of all the cut point values in the cut dimension as a target cut point value; and
    cutting the rule subset to obtain two subsets according to the cut dimension and the target cut point value.

3. The method according to claim 2, wherein, before selecting the dimension having the greatest number of cut point values as the cut dimension, the method further includes:
  determining whether the global average overlap rate of the rule subset is less than a threshold; and
  if the global average overlap rate of the rule subset is less than the threshold, cutting the rule subset using the fast tree building algorithm.

4. The method according to claim 2, wherein,
  before performing the tree building for each of the rule subsets, the method further includes:
    adding a black hole rule including N dimensions in the rule subset, wherein the N dimensions include n non-sensitive dimensions, N is a natural number, and n is greater than or equal to 1 and less than N;
  wherein, performing the tree building for each of the rule subsets, includes:
    if the cut dimension is the non-sensitive dimension in the tree building, duplicating the black hole rule into two branches.

5. The method according to claim 1, wherein, the method further includes:
  transmitting node information of the decision trees to a non-transitory storage medium, wherein the storage medium includes a first storage medium on a field programmable gate array (FPGA) and a second storage medium outside the FPGA, the node information about a merged node in the decision tree is stored into the second storage medium, and the merged node includes at least two nodes.

6. A non-transitory machine-readable storage medium comprising instructions, the instructions executable by a processor to:
cyclically split an initial rule set to generate a plurality of rule subsets; and
perform tree building for each of the rule subsets to obtain a plurality of decision trees for packet classification, wherein there is a one-to-one correspondence between the decision trees and the rule subsets,
wherein, to cyclically split the initial rule set includes:
selecting, by the splitting module, a target rule set from a rule set group, wherein the rule set group includes the initial rule set before the cyclic splitting and will include the plurality of rule subsets after the cyclic splitting, the target rule set is a rule set having a highest global average overlap rate in the rule set group,
splitting, by the splitting module, the target rule set according to a split point to obtain two rule sets having different global average overlap rates, and
adding, by the splitting module, the two rule sets into the rule set group to replace the target rule set, and continuing to select a new target rule set from the rule set group, until the number of rule sets included in the rule set group reaches a preset number and
select a split dimension of the split point according to the proportion of rules having an overlap rate of 1 in the target rule set and an average overlap rate of the target rule set, sort the rules in the target rule set in an ascending order for the overlap rates and determine a split point overlap rate weight of the split point according to the location of the last rule having an overlap rate of 1;
split the target rule set into a first rule subset and a second rule subset according to the determined split point overlap rate weight in the selected split dimension, wherein the first rule subset includes a rule having an overlap rate of 1, and the second rule subset includes a rule having an overlap rate larger than 1.

7. The storage medium of claim 6, further comprising instructions to:
determine whether the global average overlap rate of the rule subset is less than a threshold; and
if the global average overlap rate of the rule subset is less than the threshold, cut the rule subset using a fast tree building algorithm, until each of subsets obtained by the cut has one cut section in any dimension.

8. The storage medium of claim 7, further comprising instructions to:
a hole-filling module to add a black hole rule including N dimensions in the rule subset, wherein the N dimensions include n non-sensitive dimensions, N is a natural number, and n is greater than or equal to 1 and less than N;
if the cut dimension is the non-sensitive dimension in the tree building, the tree building module duplicates the black hole rule into two branches.

9. The storage medium of claim 6,
wherein, the storage medium includes a first storage medium on a field programmable gate array (FPGA) and a second storage medium outside the FPGA, the node information about a merged node in the decision tree is stored into the second storage medium, and the merged node includes at least two nodes.

10. A device, including a processor and a non-transitory storage medium for storing machine executable instructions, wherein the processor executes the machine readable instructions to:
cyclically split an initial rule set to generate a plurality of rule subsets; and
perform tree building for each of the rule subsets to obtain a plurality of decision trees for packet classification, wherein there is a one-to-one correspondence between the decision trees and the rule subsets,
wherein, to cyclically split the initial rule set includes:
selecting a target rule set from a rule set group, wherein the rule set group includes the initial rule set before the cyclic splitting and will include the plurality of rule subsets after the cyclic splitting, the target rule set is a rule set having a highest global average overlap rate in the rule set group;
splitting the target rule set according to a split point to obtain two rule sets having different global average overlap rates; and
adding the two rule sets into the rule set group to replace the target rule set, and continuing to select a new target rule set from the rule set group until the number of rule sets included in the rule set group reaches a preset number and
select a split dimension of the split point according to the proportion of rules having an overlap rate of 1 in the target rule set and an average overlap rate of the target rule set;
sort the rules in the target rule set in an ascending order for the overlap rates and determine a split point overlap rate weight of the split point according to the location of the last rule having an overlap rate of 1; and
split the target rule set into a first rule subset and a second rule subset according to the determined split point overlap rate weight in the selected split dimension, wherein the first rule subset includes a rule having an overlap rate of 1, and the second rule subset includes a rule having an overlap rate larger than 1.

11. The device according to claim 10, wherein, by executing the machine executable instructions, the processor is further caused to:
determine whether the global average overlap rate of the rule subset is less than a threshold, and
if the global average overlap rate of the rule subset is less than the threshold, cut the rule subset using a fast tree building algorithm, until each of subsets obtained by the cut has one cut section in any dimension.

12. The device according to claim 10, wherein, by executing the machine executable instructions,
before performing the tree building for each of the rule subsets, the processor is further caused to:
add a black hole rule including N dimensions in the rule subset, wherein the N dimensions include n non-sensitive dimensions, N is a natural number, and n is greater than or equal to 1 and less than N;
when performing the tree building for each of the rule subsets, the processor is further caused to:
if the cut dimension is the non-sensitive dimension in the tree building, duplicate the black hole rule into two branches.

13. The device according to claim 10, wherein the storage medium includes a first storage medium on a field programmable gate array (FPGA) and a second storage medium outside the FPGA, the node information about a merged node in the decision tree is stored into the second storage medium, and the merged node includes at least two nodes.

14. The storage medium of claim 6, wherein the fast tree building algorithm includes:
- selecting, by the tree building module, a dimension having the greatest number of cut point values as a cut dimension;
- selecting, by the tree building module, a cut point value in the middle of all the cut point values in the cut dimension as a target cut point value; and
- cutting, by the tree building module, the rule subset to obtain two subsets according to the cut dimension and the target cut point value.

15. The device of claim 10, wherein the fast tree building algorithm includes:
- selecting a dimension having the greatest number of cut point values as a cut dimension;
- selecting a cut point value in the middle of all the cut point values in the cut dimension as a target cut point value; and
- cutting the rule subset to obtain two subsets according to the cut dimension and the target cut point value.

* * * * *